US009361911B1

(12) United States Patent
Matsumoto et al.

(10) Patent No.: US 9,361,911 B1
(45) Date of Patent: Jun. 7, 2016

(54) MAGNETIC RECORDING HEAD AND DISK DEVICE WITH THE SAME

(71) Applicant: Kabushiki Kaisha Toshiba, Minato-ku, Tokyo (JP)

(72) Inventors: Takuya Matsumoto, Tokyo (JP); Tomoko Taguchi, Kunitachi Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/812,699

(22) Filed: Jul. 29, 2015

(30) Foreign Application Priority Data

May 14, 2015 (JP) .................................. 2015-098843

(51) Int. Cl.
*G11B 5/127* (2006.01)

(52) U.S. Cl.
CPC ...................................... *G11B 5/127* (2013.01)

(58) Field of Classification Search
CPC ........... G11B 5/127; G11B 5/33; G11B 5/147
USPC ............... 360/125.3, 125.03, 125.09, 125.04,
360/125.17, 125.12, 125.06, 125.15,
360/125.26, 125.19
See application file for complete search history.

(56) References Cited

U.S. PATENT DOCUMENTS

| | | | |
|---|---|---|---|
| 8,593,762 B1 * | 11/2013 | Sasaki ................. | G11B 5/1278 360/123.06 |
| 9,135,933 B2 * | 9/2015 | Nunokawa .......... | G11B 5/3116 |
| 2007/0253107 A1 * | 11/2007 | Mochizuki .............. | G11B 5/11 360/125.02 |
| 2010/0107034 A1 | 4/2010 | Tsurukiri et al. | |
| 2011/0314204 A1 | 12/2011 | Ootsuka et al. | |
| 2014/0025865 A1 | 1/2014 | Marukame et al. | |

FOREIGN PATENT DOCUMENTS

| | | |
|---|---|---|
| JP | 03-008175 | 1/1991 |
| JP | 2012-008651 A | 1/2012 |
| JP | 2014-021752 A | 2/2014 |

* cited by examiner

*Primary Examiner* — Allen T Cao
(74) *Attorney, Agent, or Firm* — White & Case LLP

(57) ABSTRACT

According to one embodiment, a magnetic recording head includes an air bearing surface, a main pole including an end portion exposed to the air bearing surface and configured to produce a recording magnetic field, a first shield opposing the end portion of the main pole with a first gap in a head run direction, and second shields disposed on both width direction sides of the main pole with second gaps, respectively. Each second shield includes a first side face opposing the end portion of the main pole with the second gap, and a second side face located on a side away from the main pole. The second side face is inclined to the main pole side towards a direction away from the air bearing surface.

21 Claims, 7 Drawing Sheets

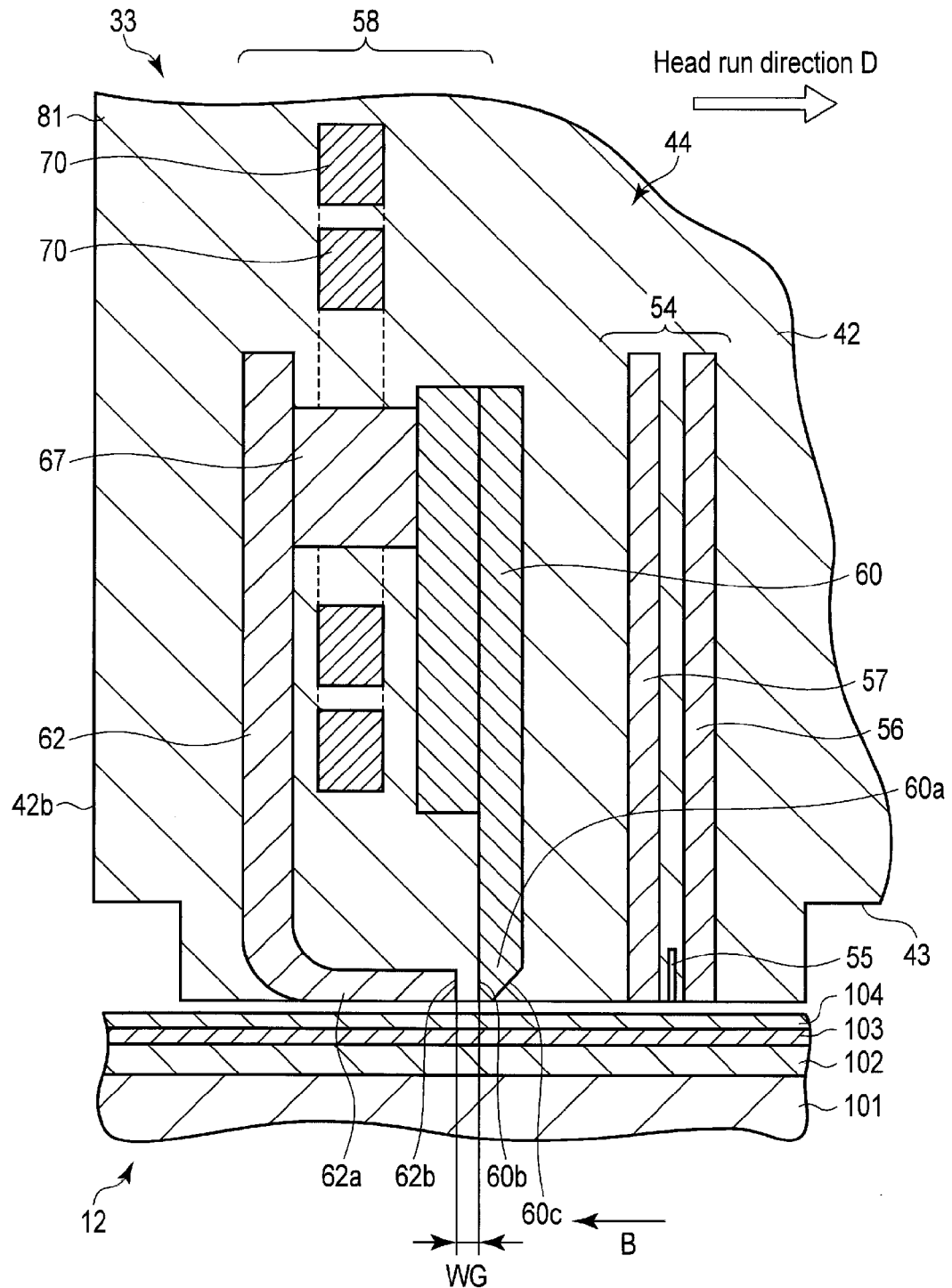
F I G. 3

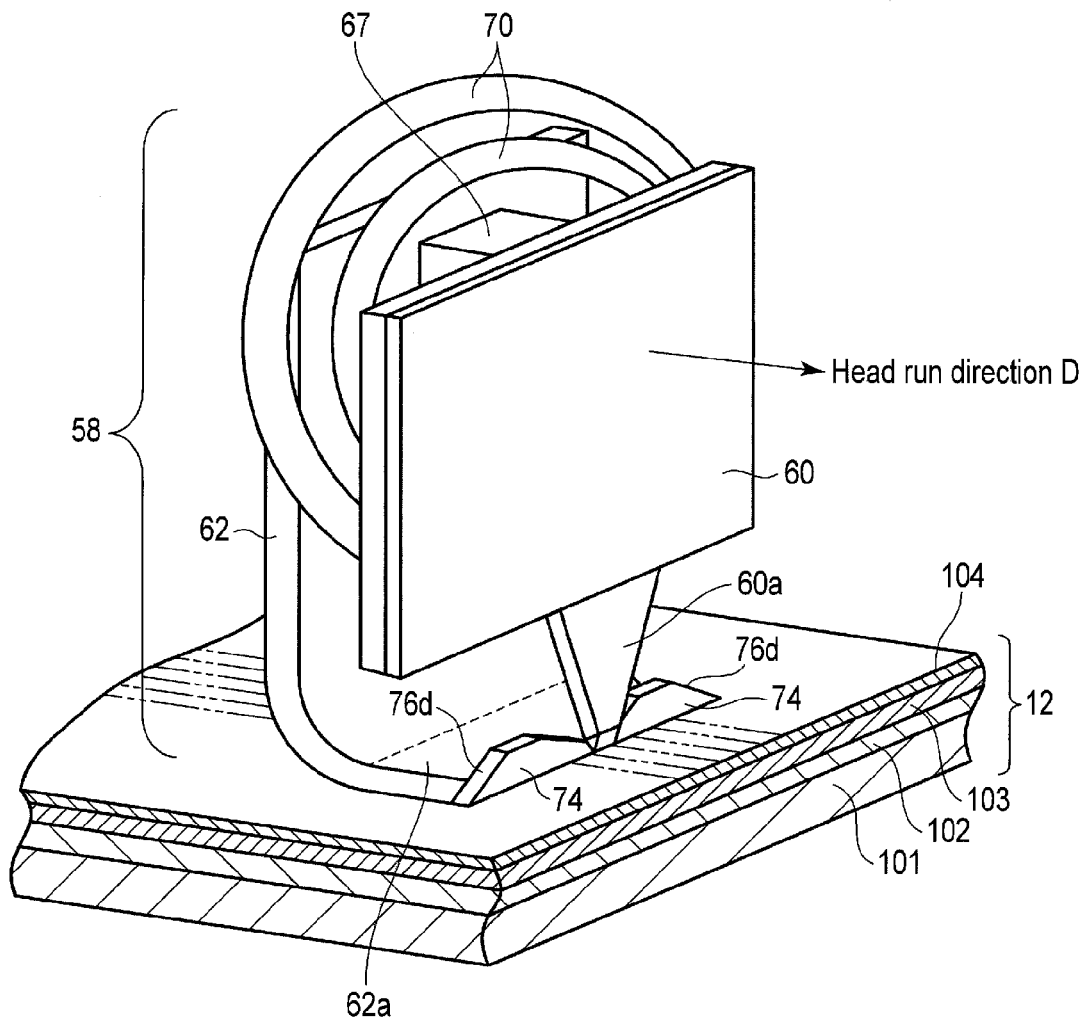
F I G. 4

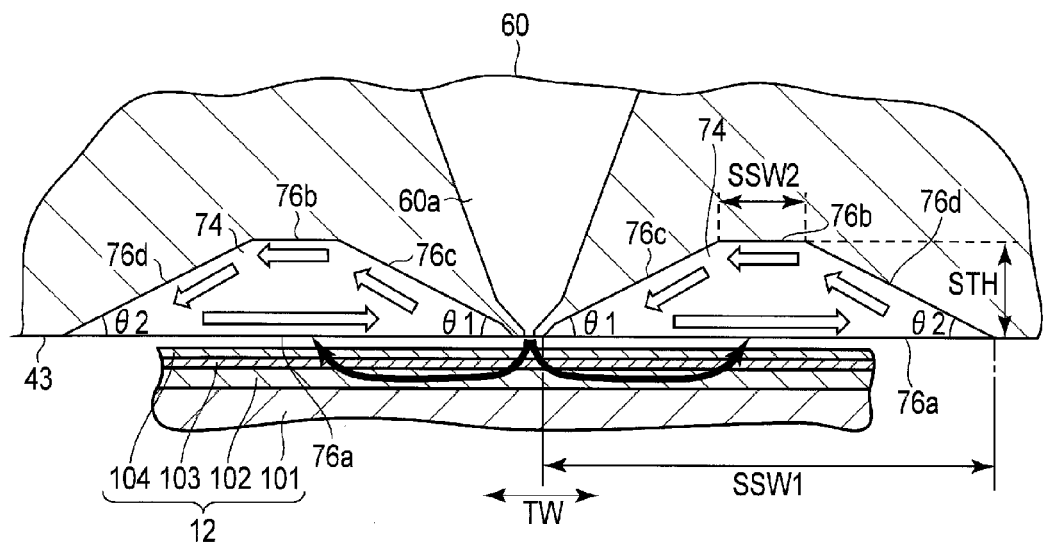
F I G. 5
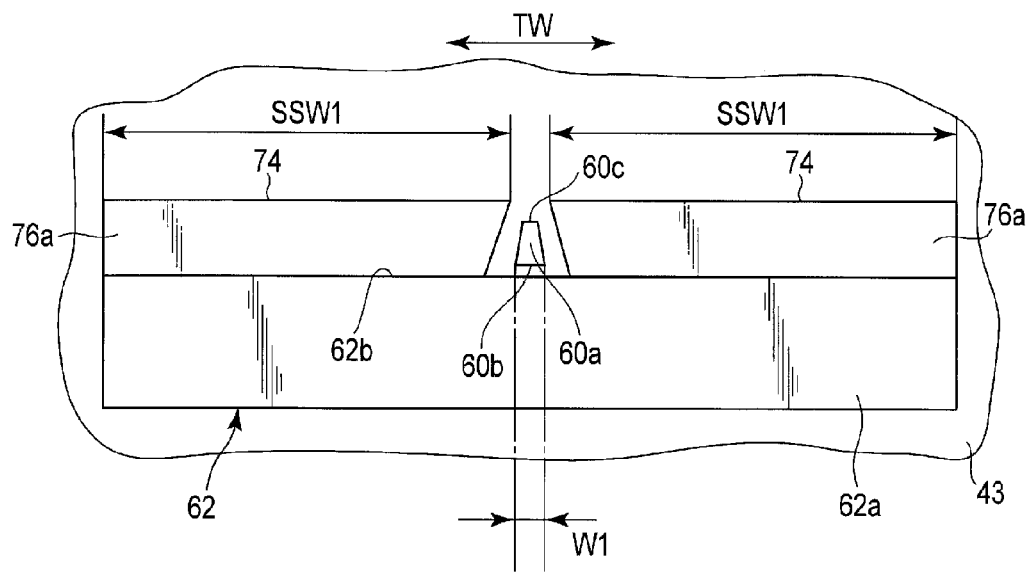
F I G. 6

MAGNETIC RECORDING HEAD AND DISK DEVICE WITH THE SAME

CROSS-REFERENCE TO RELATED APPLICATIONS

This application is based upon and claims the benefit of priority from Japanese Patent Application No. 2015-098843, filed May 14, 2015, the entire contents of which are incorporated herein by reference.

FIELD

Embodiments described herein relate generally to a magnetic recording head and a disk device comprising the magnetic recording head.

BACKGROUND

As a disk device, for example, a magnetic disk drive comprises a magnetic disk provided in a case, a spindle motor configured to support and rotate the magnetic disk and a magnetic head configured to read/write data from/to the magnetic disk. The magnetic head includes a recording head for writing and a read head for reading.

In recent years, the magnetic head for vertical magnetic recording has been proposed to increase the recording density and capacity of the magnetic disk drive, or to achieve miniaturization of the device. In such the magnetic head, the recording head includes a main pole which produces a magnetic field perpendicular to a recording surface of the magnetic disk and a write-shield magnetic pole placed to oppose to the main pole via a write gap. Further, for suppression of the degradation of recorded data due to the return magnetic field from the main pole, a head in which both width sides of the main pole are provided with side shields has been proposed.

It is expected that the recording head with such side shields, which can suppress magnetic field leakage in the width direction from the main pole, will be able to prevent the increase in erase width. However, in some cases, the magnetic flux in the main pole, a recording layer of the magnetic disk, and the side shield affects part of the magnetization in the side shield to be directed perpendicular to the recording layer. As a result, when recording is repeatedly carried out on the same tracks, the following drawback may occur. That is, the magnetic field produced from directly beneath the side shield, which has a width covering several tens of tracks, sometimes undesirably erase or degrade data recorded in a wide region over these tracks.

BRIEF DESCRIPTION OF THE DRAWINGS

FIG. 3 is an enlarged sectional view showing a head portion of the magnetic head and a magnetic disk.

FIG. 4 is a perspective diagram schematically showing a recording head of the magnetic head.

FIG. 5 is a side view of a side end of an air bearing surface (ABS) of the recording head as viewed from a reading end side of a slider.

FIG. 6 is a plan view of the recording head as viewed from the air bearing surface side.

DETAILED DESCRIPTION

Various embodiments will be described hereinafter with reference to the accompanying drawings. In general, according to one embodiment, a magnetic recording head comprises: an air bearing surface; a main pole comprising an end portion exposed to the air bearing surface and configured to produce a recording magnetic field; a first shield opposing the end portion of the main pole with a first gap in a head run direction; and second shields disposed on both sides in a width direction of the main pole with second gaps, respectively. Each of the second shields comprises a first side face opposing the end portion of the main pole with the respective second gap interposed therebetween, and a second side face located on a side away from the end portion of the main pole, and the second side face being inclined to the main pole side towards a direction away from the air bearing surface.

As a disk device, a hard disk drive (HDD) according to an embodiment will now be described in detail.

Note that the disclosure is presented for the sake of exemplification, and any modification and variation conceived within the scope and spirit of the invention by a person having ordinary skill in the art are naturally encompassed in the scope of invention of the present application. Furthermore, the width, thickness, shape, and the like of each element are depicted schematically in the figures as compared to actual embodiments for the sake of simpler explanation, and they do not limit the interpretation of the invention of the present application. Furthermore, in the description and figures of the present application, structural elements having the same or similar functions will be referred to by the same reference numbers and detailed explanations of them that are considered redundant may be omitted.

Figure 1:
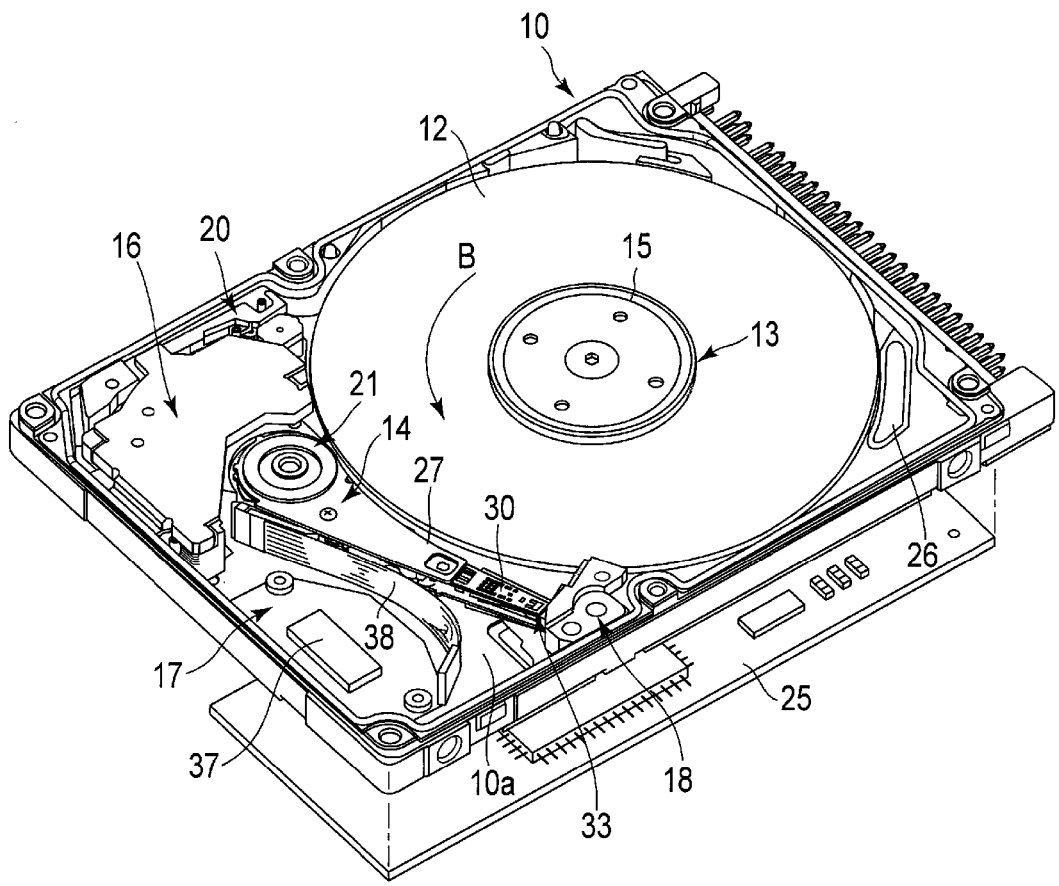
FIG. 1 is a perspective diagram showing a hard disk drive (hereinafter, HDD) according to an embodiment.
Figure 2:
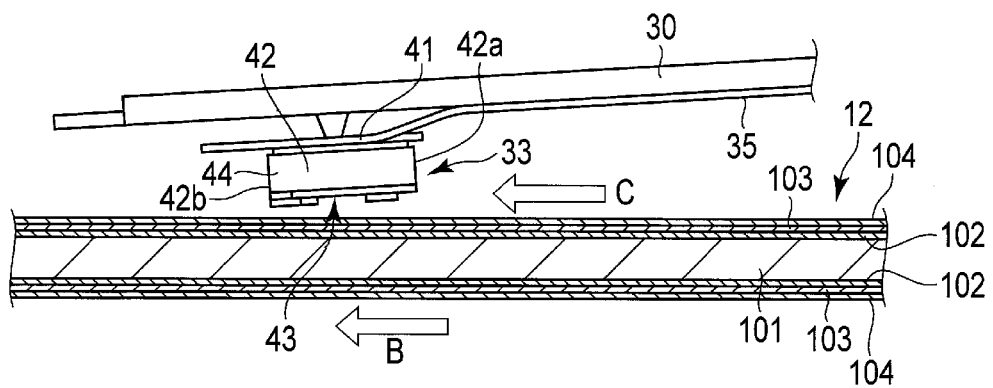
FIG. 2 is a side view showing a magnetic head and a suspension in the HDD.

FIG. 1 shows an internal structure of an HDD according to an embodiment, where a top cover is removed, and FIG. 2 shows a magnetic head in a flying state. As shown in FIG. 1, the HDD comprises a housing 10. The housing 10 comprises a base 10a in the shape of a rectangle box whose upper surface is opened, and a top cover of a rectangular plate (not shown), which corresponds to the upper surface of the base 10a. The housing 10 is airtight, and can be ventilated only by way of, for example, an air-pass filter 26 communicating with the outside.

On the base 10a, a magnetic disk 12 as a recording medium and a mechanism section are provided. The mechanism section comprises a spindle motor 13 configured to support and rotate the magnetic disk 12, a plurality of, for example, two magnetic heads 33 configured to record or read data on/from the magnetic disk 12, a carriage assembly 14 configured to movably supports the magnetic heads 33 with respect to the surface of the magnetic disk 12, and a voice coil motor (hereinafter, called a VCM) 16 configured to rotate and position the carriage assembly 14. Further, a ramp load mechanism 18 configured to hold a magnetic head 33 in a position spaced apart from the magnetic disk 12 when the magnetic heads 33 move to the outermost circumference of the magnetic disk 12, a latch mechanism 20 configured to hold the carriage assembly 14 in a retreating position when an impact or the like acts on the HDD, and a substrate unit 17 are provided on the base 10a. Electronic components including a conversion connector 37 and the like are mounted on the substrate unit 17.

A control circuit substrate 25 is screwed to the outer surface of the base 10a to be positioned opposite to the bottom wall of the base 10a. The control circuit substrate 25 is configured to control operations of the spindle motor 13, and to control the operations of the VCM 16 and the magnetic head 33 via the substrate unit 17.

As shown in FIG. 1, the magnetic disk 12 is mutually coaxially fitted to the hub of the spindle motor 13 and also clamped by a clamp spring 15 screwed to the upper end of the hub to be fixed to the hub. The magnetic disk 12 is rotated by the spindle motor 13 as a drive motor in a direction indicated by arrow B at a predetermined speed.

The carriage assembly 14 comprises a bearing 21 fixed onto the bottom wall of the base 10a, a plurality of arms 27 extending from the bearing 21 and a plurality of suspensions 30 in the form of an elongated plates, extending from the arms 27. Each suspension 30 is formed of a plate spring and the proximal end thereof is fixed to the tip end of the respective arm 27 by spot welding or adhesion. Each suspension 30 may also be formed integrally with the corresponding arm 27. The magnetic head 33 is supported on a tip end portion of the suspension 30. The arm 27 and the suspension 30 form a head suspension and the head suspension and the magnetic head 33 form a head suspension assembly.

As shown in FIG. 2, each magnetic head 33 comprises a slider 42 substantially in the shape of a parallelopiped and a head section 44 for reading/writing provided at an outflow end (trailing end) of the slider 42. The magnetic head 33 is fixed to a gimbal spring 41 provided at the tip end portion of the suspension 30. A plurality of (for example, two) arms 27 are positioned parallel to each other at predetermined intervals and the suspensions 30 and the magnetic heads 33 mounted on these arms can be placed opposite to each other across the magnetic disk 12. Each magnetic head 33 is electrically connected to a relay FPC 38 extending out from a circuit board unit 17 via a trace member 35 fixed on the suspension 30 and the arm 27.

By passing a current to the voice coil of the VCM 16 while the magnetic disk 12 is rotating, the head actuator 14 is rotationally moved and the magnetic head 33 is moved and positioned on a desired track of the magnetic disk 12. At this point, the magnetic head 33 is moved between an inner circumferential edge and an outer circumferential edge of the magnetic disk 12 in the radial direction of the magnetic disk 12.

Then, the configuration of the magnetic disk 12 and the magnetic head 33 will be described in detail. FIG. 3 is an enlarged sectional view showing the head unit 44 of the magnetic head 33 and the magnetic disk 12.

As shown in FIGS. 1 to 3, the magnetic disk 12 comprises a discoid substrate 101 about, for example, 65 mm (2.5 inches) in diameter and made of a nonmagnetic substance. A soft magnetic layer 102 made of a material exhibiting soft magnetic properties as a base layer, a recording layer 103 having magnetic anisotropy in a direction perpendicular to the disk surface as an upper layer thereof, and a protective film layer 104 as an upper layer thereof are stacked in this order on each surface of the substrate 101.

As shown in FIGS. 2 and 3, the magnetic head 33 is configured as a flying head and comprises the slider 42 formed substantially in the shape of a parallelopiped and the head section 44 provided at an outflow end (trailing end) 42b of the slider 42. The slider 42 is formed of, for example, a sintered body of alumina and titanium carbide (AlTiC) and the head section 44 is formed by stacking thin films.

The slider 42 comprises a rectangular air bearing surface (ABS) 43 opposite to the surface of the magnetic disk 12. The slider 42 is floated by an air flow C produced by the rotation of the magnetic disk 12 between the surface of the magnetic disk 12 and the ABS 43. The direction of the air flow C matches a rotation direction B of the magnetic disk 12. The slider 42 is arranged in such a way that the longitudinal direction of the ABS 43 substantially matches the direction of the air flow C with respect to the surface of the magnetic disk 12.

The slider 42 comprises a reading end 42a positioned on an inflow side of the air flow C and a trailing end 42b positioned on an outflow side of the air flow C. A leading step, trailing step, side step, negative pressure cavity (not shown) and the like are formed on the ABS 43 of the slider 42.

As shown in FIG. 3, the head section 44 comprises a read head 54 and a recording head (magnetic recording head) 58 formed by a thin film process at the trailing end 42b of the slider 42 and is formed as a separate magnetic head. The read head 54 and the recording head 58 are covered by a nonmagnetic protective insulating film 81 except for a portion exposed to the ABS 43 of the slider 42. The protective insulating film 81 forms an outer shape of the head section 44.

The read head 54 comprises a magnetic film 55 exhibiting a magneto-resistance effect and shield films 56 and 57 arranged on a trailing side and a leading side of the magnetic film 55 to sandwich the magnetic film 55 therebetween. Lower ends of the magnetic film 55 and the shield films 56 and 57 are exposed to the ABS 43 of the slider 42.

The recording head 58 is provided on the side of the trailing end 42b of the slider 42 with respect to the read head 54. FIG. 4 is a perspective view schematically showing the recording head 58 and the magnetic disk 12, FIG. 5 is a side view of an ABS-side end portion of the recording head as viewed from the reading end side of the slider and FIG. 6 is a plan view of the recording head portion as viewed from the ABS side.

As shown in FIGS. 3 and 4, the recording head 58 comprises a main pole 60 made of a soft magnetic material having high magnetic permeability and a high-saturation magnetic flux density producing a recording magnetic field in a direction perpendicular to the surface (to the recording layer 103) of the magnetic disk 12, a write shield magnetic pole (trailing shield) 62 arranged on the trailing side of the main pole 60 with a write gap (first gap) WG therebetween and made of a soft magnetic material provided to efficiently close a magnetic path via a soft magnetic layer 102 of the magnetic disk 12 directly below the main pole 60, a junction 67 physically joining an upper portion of the main pole 60 to the write shield magnetic pole 62 and a recording coil 70 arranged so as to be wound around a magnetic core including the main pole 60 and the write shield magnetic pole 62 to direct a magnetic flux to the main pole 60 when a signal is to be written to the magnetic disk 12. The recording head 58 further comprises a pair of side shields 74 made of a soft magnetism material, which are arranged both sides of the main pole 60 in the track-width direction (to interpose a second gap therebetween) while being magnetically divided from the main pole 60 on the ABS 43.

The recording coil 70 is wound around the junction 67, for example, between the main pole 60 and the write shield magnetic pole 62. The current fed to the recording coil 70 from a write amplifier (not shown) is controlled by the control circuit substrate (control unit) 25 of the HDD. When a signal is written to the magnetic disk 12, a predetermined current is fed from the write amplifier to the recording coil 70 to produce a magnetic field by directing magnetic flux to the main pole 60.

As shown in FIGS. 3 to 6, the main pole 60 extends almost perpendicularly to the ABS 43 or the surface of the magnetic disk 12. A tip portion 60a of the main pole 60 on the side of the ABS 43 is narrowed by tapering down toward the ABS 43 and the surface of the magnetic disk 12 and is formed in a columnar shape narrower than other portions. A tip end surface of the main pole 60 is exposed to the ABS 43 of the slider 42. The width of the tip portion 60a of the main pole 60 (width in the track width direction TW) approximately corresponds to the track width in the magnetic disk 12.

The write shield magnetic pole 62 is approximately L-shaped and a tip portion 62a thereof is formed as an elongated rectangle. A tip end surface of the write shield magnetic pole 62 is exposed to the ABS 43 of the slider 42. The tip portion 62a of the write shield magnetic pole 62 comprises a leading side end face (magnetic pole end face) 62b opposite to the tip portion 60a of the main pole 60. The leading side end face 62b extends in the width direction TW of the track of the magnetic disk 12 and the length thereof is sufficiently greater than the width W1 of the tip portion 60a of the main pole 60 and the track width of the magnetic disk 12. The reading side end face 62b extends almost perpendicularly to the recording layer 103 of the magnetic disk 12 and the ABS 43 of the slider. On the ABS 43, the lower end edge of the leading side end face 62b is opposite in parallel to a trailing side end face 60b of the main pole 60 with the write gap WG therebetween.

As shown in FIGS. 4 to 6, the pair of side shields 74 provided on both track-width sides of the tip portion 60a of the main pole 60 are formed of a material having high magnetic permeability, integrally with the tip portion 62a of the write shields magnetic pole 62, and project toward the reading end side of the slider 42 from the reading side end face 62b of the tip portion 62a. Each side shield 74 is formed to have such a width or thickness that it exceeds the reading side end face 60c of the main pole 60 from the reading side end face 62b of the write shield magnetic pole 62.

Each side shield 74 comprises a substantially rectangular bottom surface (first surface) 76a, exposed to the ABS 43, an upper surface (second surface) 76b away from the ABS 43 by only a distance STH in a height increasing direction (direction away from the ABS and perpendicular to the ABS) and substantially parallel to the bottom surface 76a, a first side surface 76c opposite to the tip portion 60a of the main pole 60 to sandwich the second gap therebetween and a second side surface 76 located on the opposite side to the main pole 60.

A main-pole-side end of the bottom surface 76a is opposite to the main pole 60 with a gap therebetween. The length SSW2 of the upper surface 76b in the track-width direction may be formed, for example, one half or less than the length SSW1 of the bottom surface in the track-width direction.

The first side surface 76c of each side shield 74 is inclined by an angle of inclination θ1 so that it becomes further away from the main pole 60 towards the height increasing direction from a main-pole side end of the bottom surface 76a to a main-pole side end of the upper surface 76b, that is, to widen the distance from the main pole 60.

The second side surface 76d of each side shield 74 is inclined by an angle of inclination θ2 so that it becomes closer to the main pole 60 towards the height increasing direction from an end of the bottom surface 76a, which is opposite to the main pole 60 to the other end of the upper surface 76b. The angle of inclination θ2 with respect to the ABS 43 is set to 85 deg. or less, desirably, 12 to 60 deg. The distance STH is set as a height or width greater than or equal to the height or width of the reading side end face 62b of the write-shields magnetic pole 62.

The angle of inclination 92 is set to be equal to angle of inclination θ1 (θ2=θ1), but this relationship may be set as: (θ2<θ1). With this structure, the form of each side shield 74 as viewed from the reading end side of the slider 42, that is, the shape of the side shield 74 in the film-forming direction of the film surface, or the shape of the cross section perpendicular to the ABS 43 and the head run direction D, is trapezoidal.

With the HDD configured as above, the carriage assembly 14 is rotated by driving the VCM 16, and the magnetic head 33 is moved and positioned on a desired track of the magnetic disk 12. Further, the magnetic head 33 flies by the air flow C produced between the surface of the magnetic disk 12 and the ABS 43 by the rotation of the magnetic disk 12. While the HDD is in operation, the ABS 43 of the slider 42 is maintained to be opposite to the surface of the magnetic disk 12 while maintaining a gap therebetween. In this state, recorded data is read from the magnetic disk 12 by the read head 54 and data is written thereto by the recording head 58.

In writing data, the main pole 60 is driven by the recording coil 70 to apply a recording magnetic field in a perpendicular direction from this main pole 60 to the recording layer 103 of the magnetic disk 12 directly therebeneath, and thus the data is recorded in a desired track. As indicated by an arrow in FIG. 5, magnetic domains in each side shield 74 form closure domains when recording data. Therefore, in the side shield 74, the direction of magnetization is established in an in-plan direction (direction parallel to the recording layer 103) with respect to the recording layer 103. As a result, it becomes possible to control the application of the magnetic field from the side shield 74 to the recording layer 103, which may erase or degrade recorded data.

Figure 7:
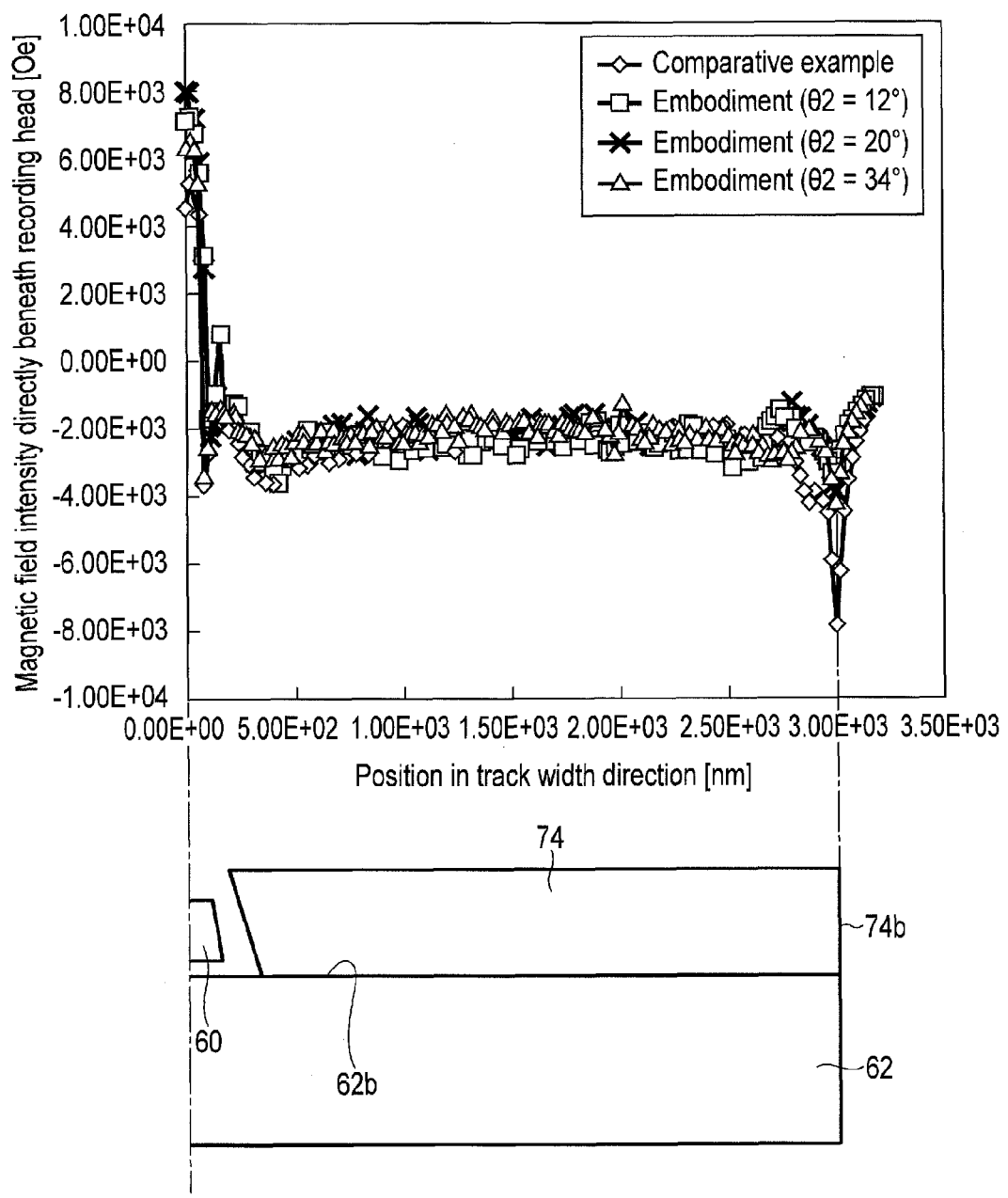
FIG. 7 is a diagram showing a comparison in recording magnetic field distribution of a track width direction between the recording head of this embodiment and a recording head of a comparative example (a typical recording head with a side shield).

FIG. 7 shows a comparison in profile of distribution of the recording magnetic field in the track width direction between a recording head of a comparative example (typical recording head with a side shield) and the recording head 58 according to this embodiment. As to the recording head 58 according to this embodiment, three examples are presented, in which the angle of inclination 82 of the second side face 76d of the side shield 74 is 12 deg., 20 deg. and 34 deg.

In FIG. 7, the location in the track-width direction, where the position=0 is the centre position of the main pole 60 of the recording head 58 in the track-width direction. From the figure, it is understood that the magnetic field intensity has increased at the position +3 μm in the track-width direction (which is at an end edge 74b of the side shield 74, which is on the opposite side to the main pole). In the case of the recording head of the comparative example, it is calculated that a leakage magnetic field of about 8,000 Oe is applied to the recording medium. Note that when the recording layer 103 employs a recording medium having a coercive force of, for example, 6000 Oe, recorded signals may be erased in the recording head of the comparative example.

In contrast, it can be understood from the figure that with the recording head 58 of this embodiment, the magnetic field intensity in the end edge 74b is suppressed to about 4000 Oe in each of the examples. Therefore, by using the recording head 58 according to this embodiment, erase or degradation of recorded data on neighboring tracks can be suppressed, making it possible to achieve long-term data storage. Thus, the reliability of the device can be improved.

Figure 8:
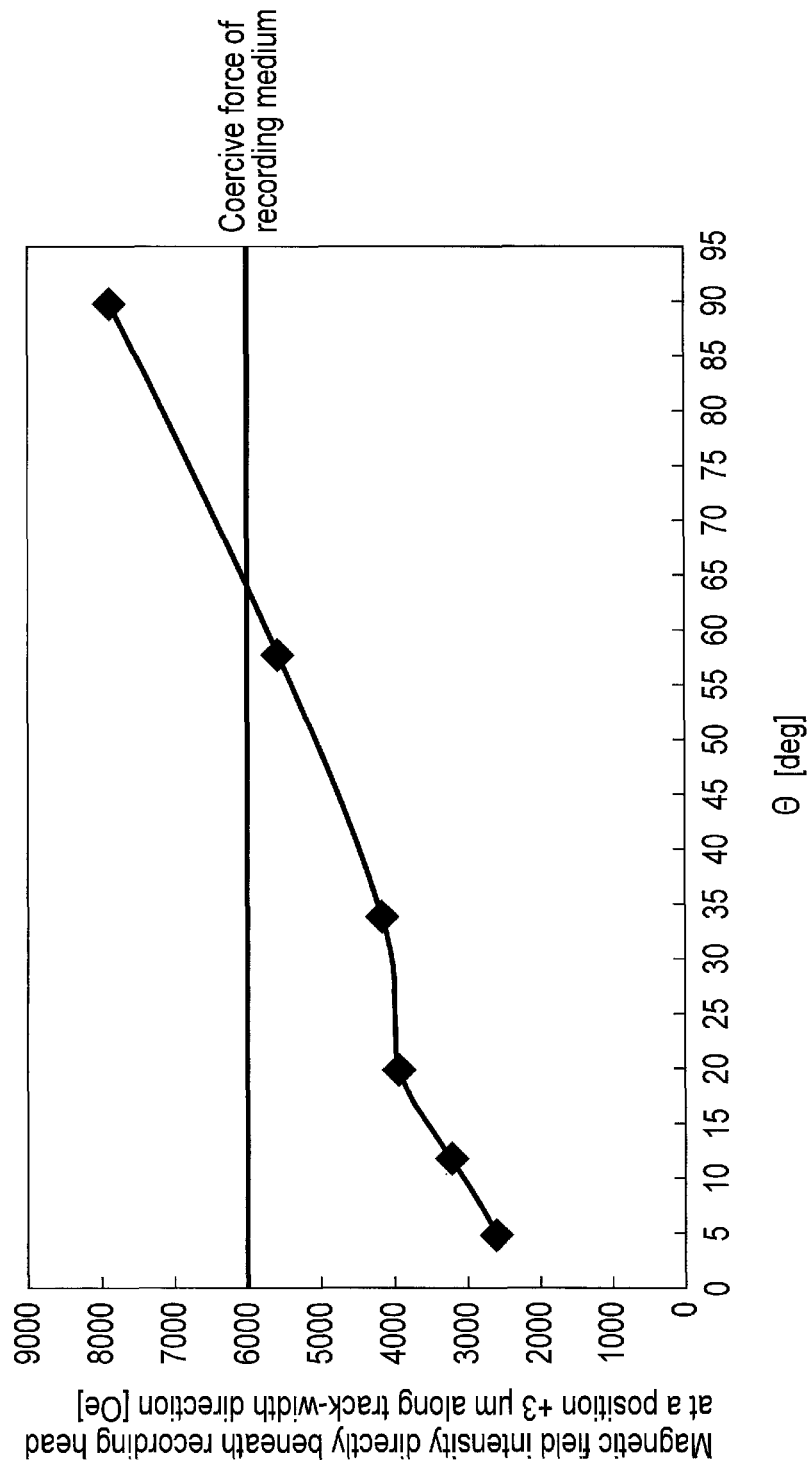
FIG. 8 is a diagram on which relationship between magnetic field intensity at a location +3 μm along the track-width direction (that is, a location corresponding to an end edge of a side shield which is on the opposite side to a main pole) and an angle inclination θ2 of a side surface of the side shield is plotted.

FIG. 8 is a diagram in which the relationship between the magnetic field intensity at a position of +3 μm in the track-width direction (that is, the end edge 47b of the side shield 47, which is on the opposite side to the main pole) and the angle of inclination θ2 of the side shield is plotted. Note that the angle of inclination θ2 of the magnetic head according to the comparative example is equivalent to 90 deg. (θ2=90 deg.). As the angle of inclination θ2 becomes smaller, the magnetic field intensity in the end edge 74b of the side shield 74 tends to become smaller. When the magnetic disk employs a recording layer having a coercive force of, for example, 6000 [Oe], the magnetic field intensity of the side shield is lower than 6000 [Oe] within a range of θ2<60 deg. Thus, erase of a recorded signal can be suppressed under this condition.

Figure 9:
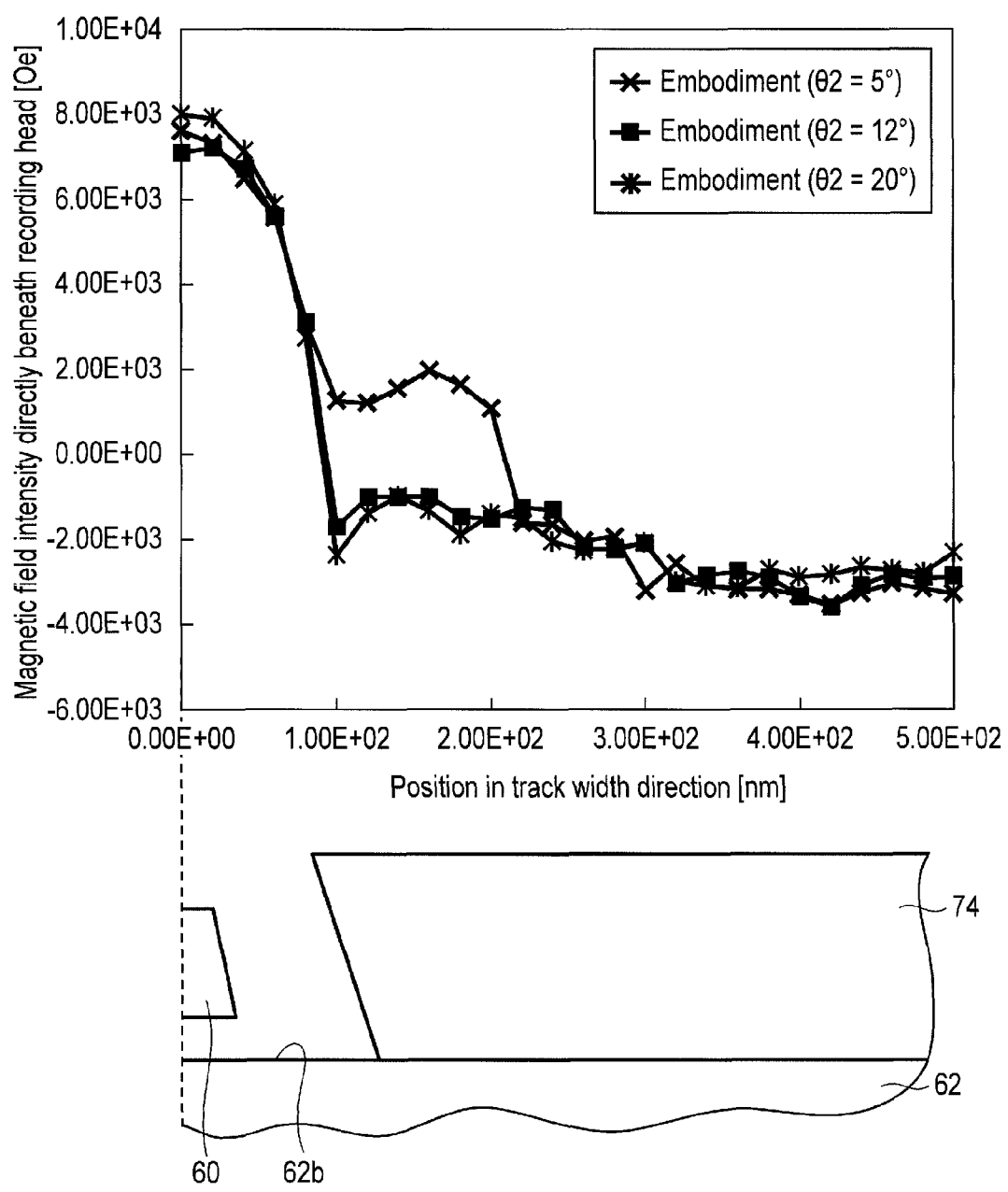
FIG. 9 is a diagram showing a comparison in recording magnetic field distribution in the track-width direction between the three recording heads (θ2=20 deg., 12 deg., and 5 deg.) according to the embodiment.

FIG. 9 shows comparison in recording magnetic field distribution of the track-width direction between the three recording heads 58 according to this embodiment about (θ2=20 deg., 12 deg., 5 deg). At θ2=5 deg., the magnetic field intensity transitions to be positive in a range of the position +100 to 200 nm along the track-width direction. This result indicates that the side shield 74 is magnetically saturated to be unable to function as a shield. Therefore, the angle of inclination θ2 of the second side face 76d of the side shield 74 should preferable be in a range of the following relationship: 12 deg.<θ2<60 deg. Further, the size of SSW2 should desirably be SSW2>0.

As described above, the magnetic recording head and HDD according to the embodiments, it is possible to suppress the magnetic field which erases or degrades recorded data in a wide neighboring track domain over several tens of tracks on the magnetic disk 12 while maintaining the on-track signal quality of the magnetic disk 12. In this manner, a highly reliable magnetic recording head and HDD which enables long-term data storage can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the material of the element which forms the head unit, the shape, size, etc., thereof may be changed as needed. Further, in the magnetic disk device, the number of magnetic disks or magnetic recording heads may be increased as needed, and the size of the magnetic disk may be selected from various types.

What is claimed is:

1. A magnetic recording head comprising:
    an air bearing surface;
    a main pole comprising an end portion exposed to the air bearing surface and configured to produce a recording magnetic field;
    a first shield opposing the end portion of the main pole with a first gap in a head run direction; and
    second shields disposed on both sides in a width direction of the main pole with second gaps, respectively; each of the second shields comprising a first side face opposing the end portion of the main pole with the respective second gap interposed therebetween, and a second side face located on a side opposite to the first side face and away from the end portion of the main pole, and the second side face being inclined in a direction perpendicular to the air bearing surface towards the main pole side and away from the air bearing surface.

2. The magnetic recording head of claim 1, wherein each of the second shield comprises a first surface exposed to the air bearing surface and a second surface opposing the first surface with a distance therebetween, the first side surface extending from an end edge of the first surface, which is on a main-pole side to an end edge of the second surface, which is on a main-pole side, and the second side surface extending from an end edge of the first surface, which is on an opposite side to the main pole to an end edge of the second surface, which is on an opposite side to the main pole.

3. The magnetic recording head of claim 2, wherein an angle of inclination of the second side surface with respect to the air bearing surface is set in a range of 12 to 60 deg.

4. The magnetic recording head of claim 3, wherein the first side surface is inclined in a direction away from the main pole towards a direction away from the air baring surface.

5. The magnetic recording head of claim 4, wherein an angle of inclination of the first side surface with respect to the air baring surface is equal to or larger than the angle of inclination of the second side surface.

6. The magnetic recording head of claim 1, wherein an angle of inclination of the second side surface with respect to the air bearing surface is set in a range of 12 to 60 deg.

7. The magnetic recording head of claim 1, wherein the first side surface is inclined in a direction away from the main pole towards a direction away from the air baring surface.

8. The magnetic recording head of claim 1, wherein an angle of inclination of the first side surface with respect to the air baring surface is equal to or larger than an angle of inclination of the second side surface.

9. The magnetic recording head of claim 2, wherein the first side surface is inclined in a direction away from the main pole towards a direction away from the air baring surface.

10. The magnetic recording head of claim 2, wherein an angle of inclination of the first side surface with respect to the air baring surface is equal to or larger than an angle of inclination of the second side surface.

11. A disk device comprising:
    a recording medium comprising a recording layer having magnetic anisotropy perpendicularly to a surface of the recording medium; and
    the magnetic recording head of claim 1, configured to write data to the recording medium.

12. The disk device of claim 11, wherein each of the second shield comprises a first surface exposed to the air bearing surface and a second surface opposing the first surface with a distance therebetween, the first side surface extending from an end edge of the first surface, which is on a main-pole side to an end edge of the second surface, which is on a main-pole side, and the second side surface extending from an end edge of the first surface, which is on an opposite side to the main pole to an end edge of the second surface, which is on an opposite side to the main pole.

13. The disk device of claim 12, wherein an angle of inclination of the second side surface with respect to the air bearing surface is set in a range of 12 to 60 deg.

14. The disk device of claim 13, wherein the first side surface is inclined in a direction away from the main pole towards a direction away from the air baring surface.

15. The disk device of claim 14, wherein an angle of inclination of the first side surface with respect to the air baring surface is equal to or larger than 20 the angle of inclination of the second side surface.

16. The disk device of claim 11, wherein an angle of inclination of the second side surface with respect to the air bearing surface is set in a range of 12 to 60 deg.

17. The disk device of claim 11, wherein the first side surface is inclined in a direction away from the main pole towards a direction away from the air baring surface.

18. The disk device of claim 11, wherein an angle 30 of inclination of the first side surface with respect to the air baring surface is equal to or larger than an angle of inclination of the second side surface.

19. The disk device of claim 12, wherein the first side surface is inclined in a direction away from 35 the main pole towards a direction away from the air baring surface.

20. The disk device of claim 12, wherein an angle of inclination of the first side surface with respect to the air baring surface is equal to or larger than an angle of inclination of the second side surface.

21. A magnetic recording head comprising:
an air bearing surface;
a main pole comprising an end portion exposed to the air bearing surface and configured to produce a recording magnetic field;
a first shield opposing the end portion of the main pole with a first gap in a head run direction; and
second shields disposed on both sides in a width direction of the main pole with second gaps, respectively; each of the second shields comprising a first surface exposed to the air bearing surface; a second surface opposing the first surface with a distance therebetween; a first side face opposing the end portion of the main pole with the respective second gap interposed therebetween and extending from an end edge of the first surface, which is on a main-pole side to an end edge of the second surface, which is on a main-pole side; and a second side face located on a side away from the end portion of the main pole, and the second side face being inclined to the main pole side towards a direction away from the air bearing surface and extending from an end edge of the first surface, which is on an opposite side to the main pole to an end edge of the second surface, which is on an opposite side to the main pole.

* * * * *